United States Patent
Karjala et al.

(10) Patent No.: US 9,523,015 B2
(45) Date of Patent: Dec. 20, 2016

(54) ETHYLENE-BASED POLYMERS AND PROCESSES TO MAKE THE SAME

(71) Applicant: Dow Global Technologies LLC, Midland, MI (US)

(72) Inventors: Teresa P. Karjala, Lake Jackson, TX (US); James L. Cooper, Brazoria, TX (US); Jose Ortega, Lake Jackson, TX (US); Lori L. Kardos, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/438,891

(22) PCT Filed: Dec. 19, 2013

(86) PCT No.: PCT/US2013/076423
§ 371 (c)(1),
(2) Date: Apr. 28, 2015

(87) PCT Pub. No.: WO2014/105608
PCT Pub. Date: Jul. 3, 2014

(65) Prior Publication Data
US 2015/0299493 A1 Oct. 22, 2015

Related U.S. Application Data

(60) Provisional application No. 61/746,723, filed on Dec. 28, 2012.

(51) Int. Cl.
| | | |
|---|---|---|
| *C09D 123/08* | (2006.01) | |
| *C08G 67/02* | (2006.01) | |
| *B05D 1/26* | (2006.01) | |
| *C08L 23/08* | (2006.01) | |
| *B32B 27/08* | (2006.01) | |
| *B32B 27/32* | (2006.01) | |
| *C09D 123/06* | (2006.01) | |
| *C08L 23/06* | (2006.01) | |

(52) U.S. Cl.
CPC ............. *C09D 123/06* (2013.01); *B05D 1/265* (2013.01); *B32B 27/08* (2013.01); *B32B 27/32* (2013.01); *C08L 23/06* (2013.01); *C08L 23/0815* (2013.01); *B32B 2250/02* (2013.01); *B32B 2250/242* (2013.01); *C08L 2205/02* (2013.01)

(58) Field of Classification Search
CPC ........ C09D 123/08; C08G 67/02; B05D 1/265
USPC .......................................... 525/185; 528/392
See application file for complete search history.

(56) References Cited

U.S. PATENT DOCUMENTS

| | | | |
|---|---|---|---|
| 3,676,401 A | 7/1972 | Henry | |
| 3,860,538 A | 1/1975 | Guillet et al. | |
| 4,714,741 A | 12/1987 | Balduff et al. | |
| 4,962,164 A | 10/1990 | Jabarin et al. | |
| 5,178,960 A | 1/1993 | Cook | |
| 5,286,786 A * | 2/1994 | Hoenig | C08J 3/201 524/740 |
| 6,329,464 B1 * | 12/2001 | Duran | C08L 23/04 525/185 |
| 6,333,115 B1 * | 12/2001 | Krebs | C08L 73/00 428/423.1 |
| 6,558,809 B1 | 5/2003 | Kelch et al. | |
| 6,833,333 B2 * | 12/2004 | Reisdorf | B32B 27/12 156/307.3 |

FOREIGN PATENT DOCUMENTS

| | | |
|---|---|---|
| EP | 0230143 A1 | 7/1987 |
| EP | 0984052 A1 | 3/2000 |
| GB | 1448062 A | 9/1976 |
| WO | 91/18944 A1 | 12/1991 |
| WO | 2011/071843 A1 | 6/2011 |
| WO | 2015/200426 A1 | 12/2015 |
| WO | 2015/200430 A1 | 12/2015 |

OTHER PUBLICATIONS

DuPont Elvaloy(R) 4924 Product Data Sheet, 3 pages (effective date: Aug. 19, 2009).*
Elite(TM) 5111G Enhanced Polyethylene Resin Technical Information (3 pages, published: Aug. 26, 2003).*
Scott et al., Degradable Polymers, Principles and Applications, Chapter 8: Ethylene-carbon monoxide copolymers, pp. 156-168, Chapman and Hall (1995).
Ward et al., Ethylene-Carbon Monoxide Extrudable Adhesive Copolymers for Polyvinylidene Chloride, Jun. 1988 Tappi Journal, pp. 140-144.
PCT/US2013/076423, International Search Report dated Jul. 3, 2014.
PCT/US2013/076423, International Preliminary Report on Patentability dated Jun. 30, 2015.
PCT/US2013/076423, Written Opinion of the International Searching Authority dated Jun. 28, 2015.

* cited by examiner

*Primary Examiner* — Fred M Teskin (57) ABSTRACT

The invention provides a composition comprising an ethylene-based polymer, formed from a high pressure, free-radical polymerization, and wherein the ethylene-based polymer has the following properties: a) a CO content from "greater than 0" to less than 10 weight percent CO (carbon monoxide), based on the weight of the polymer; and b) a melt index (I2) from 3 to 30 g/10 min.

13 Claims, 4 Drawing Sheets

ETHYLENE-BASED POLYMERS AND PROCESSES TO MAKE THE SAME

REFERENCE TO RELATED APPLICATIONS

This application claims the benefit of U.S. Provisional Application No. 61/746,723, filed on Dec. 28, 2012.

BACKGROUND OF THE INVENTION

Companies that extrusion coat a variety of polymers, including low density polyethylene (LDPE), onto paper and paperboard, continually have problems obtaining good "fiber tear" adhesion, which is the amount of adhesion required, to have an adhesion between the polymer to the paper greater than the adhesion of the paper fibers to themselves. When the polymer is pulled from a paper substrate, if fiber tear occurs, this adhesion is considered acceptable. If the polymer is pulled from the paper without fibers (without fiber tear), this is considered unacceptable adhesion. Improved adhesion is also desired in the extrusion lamination process, which is used to manufacture multilayer substrates. Ethylene-based polymers used for coatings and films are disclosed in the following references: International Publication Nos. WO 2011/071843, WO 1991/18944; U.S. Pat. Nos. 5,178,960, 3,860,538, 4,714,741, 6,558,809, 4,962,164, 3,676,401; GB 1448062; EP 0230143B1; Ward et al., *Ethylene-Carbon Monoxide Extrudable Adhesive Copolymers for Polyvinylidene Chloride*, June 1988 Tappi Journal, pp. 140-144; Scott et al., *Degradable Polymers, Principles and Applications*, Chapter 8: Ethylene-carbon monoxide copolymers, pp. 156-168, Chapman and Hall (1995).

It is a well known that, when running extrusion coating lines, at higher and higher line speeds, with conventional polymers, unacceptable fiber tear adhesion results. This adhesion is related to the oxidation of the molten polymer as it exits the extrusion die, and before it comes in contact with the paper (or the time in the air gap). At higher line speeds, the molten polymer curtain has less time to oxidize, which can reduce adhesion. There is a need for new ethylene-based polymers that can be used in high speed extrusion coating lines, and which have good adhesion to paper substrates, and which can be used at lower melt temperatures, and/or at higher line speeds of the paper substrate. These needs have been met by the following invention.

SUMMARY OF THE INVENTION

The invention provides a composition comprising an ethylene-based polymer, formed from a high pressure, free-radical polymerization, and wherein the ethylene-based polymer has the following properties:
  a) a CO content from "greater than 0" to less than 10 weight percent CO (carbon monoxide), based on the weight of the polymer; and
  b) a melt index (I2) from 3 to 30 g/10 min.

DETAILED DESCRIPTION

As discussed above, the invention provides a composition comprising an ethylene-based polymer, formed from a high pressure, free-radical polymerization, and wherein the ethylene-based polymer has the following properties:
  a) a CO content from "greater than 0" to less than 10 weight percent CO (carbon monoxide), based on the weight of the polymer; and
  b) a melt index (I2) from 3 to 30 g/10 min.

The inventive composition may comprise a combination of two or more embodiments as described herein.

The ethylene-based polymer may comprise a combination of two or more embodiments as described herein.

In one embodiment, the ethylene-based polymer has a CO content from "greater than 0" to less than, or equal to, 7 weight percent CO (carbon monoxide), based on the weight of the polymer.

In one embodiment, the ethylene-based polymer has a CO content from "greater than 0" to less than, or equal to, 5 weight percent CO (carbon monoxide), based on the weight of the polymer.

In one embodiment, the ethylene-based polymer has a CO content from "greater than 0" to less than, or equal to, 3 weight percent CO (carbon monoxide), based on the weight of the polymer.

In one embodiment, the ethylene-based polymer has a CO content from 0.5 to 5 weight percent CO (carbon monoxide), further from 0.5 to 3, further from 0.5 to 2, based on the weight of the polymer.

In one embodiment, the ethylene-based polymer has a CO content from 1 to 5 weight percent CO (carbon monoxide), further from 1 to 3, further from 1 to 2, based on the weight of the polymer.

In one embodiment, the ethylene-based polymer has a CO content less than, or equal to, 3 weight percent, based on the weight of the polymer.

As used herein, the CO content refers to polymerized CO in the polymer.

In one embodiment, the ethylene-based polymer comprises greater than, or equal to, 80 weight percent, further greater than, or equal to, 85 weight percent, polymerized ethylene, based on the weight of the polymer.

In one embodiment, the ethylene-based polymer comprises greater than, or equal to, 90 weight percent, further greater than, or equal to, 95 weight percent, polymerized ethylene, based on the weight of the polymer.

In one embodiment, the ethylene-based polymer comprises greater than, or equal to, 97 weight percent, further greater than, or equal to, 98 weight percent, polymerized ethylene, based on the weight of the polymer.

In one embodiment, the ethylene-based polymer has a melting point, Tm, in ° C., that meets the following relationship:

$$Tm(° C.) < 601.4 * (Density\ in\ g/cc) - 447.8(° C.).$$

In one embodiment, the ethylene-based polymer has a melting point, Tm, in ° C., that meets the following relationship:

$$Tm(° C.) < 601.4 * (Density\ in\ g/cc) - 449(° C.).$$

In one embodiment, the ethylene-based polymer has a density from 0.910 to 0.950 g/cc (1 cc=1 cm$^3$).

In one embodiment, the ethylene-based polymer has a density from 0.915 to 0.950 g/cc.

In one embodiment, the ethylene-based polymer has a density from 0.920 to 0.950 g/cc.

In one embodiment, the ethylene-based polymer has a density from 0.920 to 0.940 g/cc.

In one embodiment, the ethylene-based polymer has a density from 0.920 to 0.930 g/cc.

In one embodiment, the ethylene-based polymer has a density of less than 0.940 g/cc.

In one embodiment, the ethylene-based polymer passes fiber tear adhesion at a temperature less than, or equal to, 320° C.

In one embodiment, the ethylene-based polymer passes fiber tear adhesion at a temperature less than, or equal to, 316° C.

In one embodiment, the ethylene-based polymer passes fiber tear adhesion at a temperature less than, or equal to, 310° C.

In one embodiment, the ethylene-based polymer passes fiber tear adhesion at a temperature less than, or equal to, 305° C.

In one embodiment, the ethylene-based polymer passes fiber tear adhesion at a temperature less than, or equal to, 300° C.

In one embodiment, the ethylene-based polymer passes fiber tear adhesion at a temperature less than, or equal to, 290° C.

In one embodiment, the ethylene-based polymer has a melting temperature, Tm, from 101° C. to 113° C., further from 102° C. to 113° C., further from 103° C. to 113° C., as determined by DSC (peak temp.).

In one embodiment, the ethylene-based polymer has a melting temperature, Tm, from 105° C. to 113° C., further from 107° C. to 113° C., further from 109° C. to 113° C., as determined by DSC (peak temp.).

In one embodiment, the ethylene-based polymer has a melting temperature, Tm, greater than, or equal to, 102° C., further greater than, or equal to, 103° C., further greater than, or equal to, 104° C. as determined by DSC (peak temp.).

In one embodiment, the ethylene-based polymer has a melting temperature, Tm, greater than 107° C., as determined by DSC (peak temp.).

In one embodiment, the ethylene-based polymer has a melting temperature, Tm, from 105° C. to 108° C., as determined by DSC (peak temp.).

In one embodiment, the ethylene-based polymer has an amyl group level greater than, or equal to, 0.5 amyl group per 1000 carbon atoms, as determined by 13C NMR.

In one embodiment, the ethylene-based polymer has an amyl group level greater than, or equal to, 1.0 amyl group per 1000 carbon atoms, as determined by 13C NMR.

In one embodiment, the ethylene-based polymer has an amyl group level greater than, or equal to, 1.2 amyl group per 1000 carbon atoms, further greater than, or equal to, 1.3 amyl group per 1000 carbon atoms, further greater than, or equal to, 1.4 amyl group per 1000 carbon atoms, as determined by 13C NMR.

In one embodiment, the ethylene-based polymer has an amyl group level greater than, or equal to, 1.5 amyl group per 1000 carbon atoms, further greater than, or equal to, 1.6 amyl group per 1000 carbon atoms, as determined by 13C NMR.

In one embodiment, the ethylene-based polymer has a molecular weight distribution (cc-GPC Mw/Mn) from 4.0 to 20.0, further from 4.2 to 18.0, further from 4.5 to 15.0, as determined by conventional GPC.

In one embodiment, the ethylene-based polymer has a molecular weight distribution (cc-GPC Mw/Mn) from 4.0 to 10.0, further from 4.2 to 9.0, further from 4.5 to 8.0, as determined by conventional GPC.

In one embodiment, the ethylene-based polymer has a molecular weight distribution (cc-GPC Mw/Mn) from 6.0 to 20.0, further from 8.0 to 15.0, further from 8.0 to 12.0, as determined by conventional GPC.

In one embodiment, the ethylene-based polymer has a melt index (I2) from 3.0 to 27.0, further from 3.2 to 25.0, further from 3.5 to 20.0.

In one embodiment, the ethylene-based polymer has a melt index (I2) from 4.0 to 25.0, further from 4.5 to 20.0, further from 5.0 to 15.0.

In one embodiment, the ethylene-based polymer has a Tan Delta (0.1 rad/sec, 190° C.) greater than, or equal to, 3.0, further greater than, or equal to, 3.5.

In one embodiment, the ethylene-based polymer has a Tan Delta (0.1 rad/sec, 190° C.) greater than, or equal to, 3.5, further greater than, or equal to, 4.0, further greater than, or equal to, 4.5.

In one embodiment, the ethylene-based polymer has a Tan Delta (0.1 rad/sec, 190° C.) greater than, or equal to, 5.0, further greater than, or equal to, 6.0, further greater than, or equal to, 8.0.

In one embodiment, the ethylene-based polymer has a viscosity ratio, V0.1/V100 (each at 190° C.), from 4.0 to 20.0, further from 4.5 to 18.0, further from 5.0 to 15.0.

In one embodiment, the ethylene-based polymer has a viscosity ratio, V0.1/V100 (each at 190° C.), from 5.0 to 20.0, further from 5.5 to 18.0, further from 6.0 to 15.0.

In one embodiment, the ethylene-based polymer has a gpcBr from 1.00 to 5.00, further from 1.12 to 4.50, further from 1.15 to 4.00.

In one embodiment, the ethylene-based polymer has a gpcBR from 1.00 to 4.00, further from 1.12 to 3.50, further from 1.15 to 3.00.

In one embodiment, the ethylene-based polymer has a gpcBR from 1.10 to 1.70, further from 1.12 to 1.60, further from 1.15 to 1.50.

In one embodiment, the ethylene-based polymer has a gpcBR from 1.50 to 4.00, further from 1.75 to 3.75, further from 2.00 to 3.50.

In one embodiment, the ethylene-based polymer is a low density polyethylene (LDPE) that comprises CO comonomer.

In one embodiment, the ethylene-based polymer comprises, in polymerized form, ethylene and CO as the only monomer types. In a further embodiment, the ethylene-based polymer comprises a majority amount of polymerized ethylene, based on the weight of the polymer. In a further embodiment, the ethylene-based polymer comprises greater than, or equal to, 90 weight percent, further greater than, or equal to, 95 weight percent, polymerized ethylene, based on the weight of the polymer.

In one embodiment, the ethylene-based polymer is an ethylene-carbon monoxide copolymer.

In one embodiment, the ethylene-based polymer is present at greater than, or equal to, 10 weight percent, based on the weight of the composition.

In one embodiment, the ethylene-based polymer is present in an amount from 10 to 50 weight percent, further from 20 to 40 weight percent, based on the weight of the composition.

In one embodiment, the ethylene-based polymer is present in an amount from 60 to 90 weight percent, further from 65 to 85 weight percent, based on the weight of the composition.

In one embodiment, the ethylene-based polymer is present in an amount from 1.0 to 10 weight percent, further from 1.5 to 5.0 weight percent, based on the weight of the composition.

In one embodiment, the composition further comprises a second ethylene-based polymer. In a further embodiment, the second ethylene-based polymer is selected from a LDPE, an ethylene/alpha-olefin copolymer, or a combination thereof.

In one embodiment, the composition further comprises another ethylene-based polymer that differs in one or more properties, such as density, melt index, comonomer, comonomer content, etc., from the inventive ethylene-based polymer. Suitable other ethylene-based polymers include, but are not limited to, DOWLEX Polyethylene Resins, TUFLIN Linear Low Density Polyethylene (LLDPE) Resins, ELITE and/or ELITE AT Enhanced Polyethylene Resins (all available from The Dow Chemical Company), high density polyethylenes (d≥0.96 g/cc), medium density polyethylenes (density from 0.935 to 0.955 g/cc), EXCEED polymers and ENABLE polymers (both from ExxonMobil), LDPE, and EVA (ethylene vinyl acetate).

In one embodiment, the composition further comprises a propylene-based polymer. Suitable propylene-based polymers include polypropylene homopolymers, propylene/α-olefin interpolymers and copolymers, and propylene/ethylene interpolymers and copolymers.

In one embodiment, the composition further comprises a heterogeneously branched ethylene/α-olefin interpolymer, and preferably a heterogeneously branched ethylene/α-olefin copolymer. In one embodiment, the heterogeneously branched ethylene/α-olefin interpolymer, and preferably a heterogeneously branched ethylene/α-olefin copolymer, has a density from 0.89 to 0.94 g/cc, further from 0.90 to 0.93 g/cc. In a further embodiment, the composition comprises from 1 to 99 weight percent, further from 15 to 85 weight percent, of the inventive ethylene-based polymer, based on the weight of the composition.

In one embodiment, the composition comprises less than 5 ppm, further less than 2 ppm, further less than 1 ppm, and further less than 0.5 ppm, sulfur, based on the weight of the composition.

In one embodiment, the composition does not contain sulfur.

In one embodiment, the composition comprises from 1.5 to 80 weight percent of an inventive ethylene-based polymer. In a further embodiment, the composition further comprises a LLDPE.

In one embodiment, the composition comprises from 1.5 to 20 weight percent of an inventive ethylene-based polymer. In a further embodiment, the composition further comprises a LLDPE.

In one embodiment, the composition comprises from 20 to 80 weight percent, further from 50 to 80 weight percent, of an inventive ethylene-based polymer. In a further embodiment, the composition further comprises a LLDPE.

An inventive composition may comprise a combination of two or more embodiments as described herein.

An inventive ethylene-based polymer may comprise a combination of two or more embodiments as described herein.

The invention also provides a process for forming an inventive ethylene-based polymer of any of the previous embodiments, the process comprising polymerizing ethylene, carbon monoxide, and optionally at least one other comonomer, in at least one tubular reactor.

The invention also provides a process for forming an inventive ethylene-based polymer of any of the previous embodiments, the process comprising polymerizing ethylene, carbon monoxide, and optionally at least one other comonomer, in at least one autoclave reactor.

The invention also provides a process for forming an inventive ethylene-based polymer of any of the previous embodiments, the process comprising polymerizing ethylene, carbon monoxide, and optionally at least one other comonomer, in a combination of at least one tubular reactor and at least one autoclave reactor.

An inventive process may comprise a combination of two or more embodiments as described herein.

The invention also provides an article comprising at least one component formed from the composition of one or more embodiments described herein.

In one embodiment, the article is a coated substrate. In a further embodiment, the substrate is a paper product.

In one embodiment, the article is a laminated substrate. In a further embodiment, the substrate is a paper product.

In one embodiment, the article is produced by extrusion coating or extrusion lamination.

An inventive article may comprise a combination of two or more embodiments as described herein.

The invention also provides a coating formed from the composition of one or more embodiments described herein.

An inventive coating may comprise a combination of two or more embodiments as described herein.

Process

For producing an inventive ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 m. The beginning of a reaction zone for either type of reactor is typically defined by the side injection of either initiator for the reaction, ethylene, chain transfer agent (or telomer), comonomer(s), as well as any combination thereof. A high pressure process can be carried out in autoclave or tubular reactors having one or more reaction zones, or in a combination of autoclave and tubular reactors, each comprising one or more reaction zones.

A chain transfer agent (CTA) can be used to control molecular weight. In one embodiment, one or more chain transfer agents (CTAs) are added to an inventive polymerization process. Typical CTAs that can be used include, but are not limited to, propylene, isobutane, n-butane, 1-butene, methyl ethyl ketone, acetone, and propionaldehyde. In one embodiment, the amount of CTA used in the process is from 0.03 to 10 weight percent of the total reaction mixture.

Ethylene used for the production of the ethylene-based polymer may be purified ethylene, which is obtained by removing polar components from a loop recycle stream, or by using a reaction system configuration, such that only fresh ethylene is used for making the inventive polymer. It is not typical that only purified ethylene is required to make the ethylene-based polymer. In such cases, ethylene from the recycle loop may be used.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent (by the combined weight) of one or more additives, based on the weight of the inventive polymer composition.

In one embodiment, the polymers of this invention are treated with one or more stabilizers, for example, antioxidants, such as IRGANOX 1010, IRGANOX 1076 and IRGAFOS 168 (Ciba Specialty Chemicals; Glattbrugg, Switzerland). In general, the polymers are treated with one or more stabilizers before extrusion or other melt processes. Processing aids, such as plasticizers, include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils, useful as processing aids, include white mineral oil such as KAYDOL oil (Chemtura Corp.; Middlebury, Conn.) and SHELLFLEX 371 naphthenic oil (Shell Lubricants; Houston, Tex.). One other suitable oil is TUFFLO oil (Lyondell Lubricants; Houston, Tex.).

Blends and mixtures of the inventive polymer with other polymers may be performed. Suitable polymers for blending with the inventive polymer include natural and synthetic polymers. Exemplary polymers for blending include propylene-based polymers (for example, impact modifying polypropylene, isotactic polypropylene, atactic polypropylene, and random ethylene/propylene copolymers), various types of ethylene-based polymers, including high pressure, free-radical LDPE, LLDPE prepared with Ziegler-Natta catalysts, PE (polyethylene) prepared with single site catalysts, including multiple reactor PE ("in reactor" blends of Ziegler-Natta PE and single site catalyzed PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), EVA, ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers, such as olefin plastomers and elastomers, ethylene and propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising the inventive polymer).

Applications

An inventive polymer may be used in a variety of extrusion coating applications, such as sugar pouches, paperboard hot and cold drink cups, gable top cartons, non-wovens, woven substrates, tooth paste tubes, stand up pouches, or any other substrate where traditional LDPE or LLDPE (or blends of either) polymers would be disadvantaged due to inferior adhesion. The inventive polymer could also be used in a variety of extrusion laminations, where the advantage would be improved adhesion in the multi-layer structures, such as aseptic drink boxes, snack packaging, ream wrap, stand up pouches, tooth paste tubes, cheese packaging, lamination films, or any other extrusion lamination where LDPE or LLDPE (or blends of either) would be disadvantaged due to inferior adhesion.

The polymers of this invention may be employed in a variety of conventional thermoplastic fabrication processes to produce useful articles, including, but not limited to, monolayer and multilayer films; molded articles, such as blow molded, injection molded, or rotomolded articles; coatings; fibers; and woven or non-woven fabrics.

An inventive polymer may be used in a variety of films, including but not limited to, extrusion coating, food packaging, consumer, industrial, agricultural (applications or films), lamination films, fresh cut produce films, meat films, cheese films, candy films, clarity shrink films, collation shrink films, stretch films, silage films, greenhouse films, fumigation films, liner films, stretch hood, heavy duty shipping sacks, pet food, sandwich bags, sealants, and diaper backsheets.

An inventive polymer is also useful in other direct end-use applications. An inventive polymer may be used for wire and cable coating operations, in sheet extrusion for vacuum forming operations, and forming molded articles, including the use of injection molding, blow molding process, or rotomolding processes.

Other suitable applications for the inventive polymers include elastic films and fibers; soft touch goods, such as appliance handles; gaskets and profiles; auto interior parts and profiles; foam goods (both open and closed cell); impact modifiers for other thermoplastic polymers, such as high density polyethylene, or other olefin polymers; cap liners; and flooring.

DEFINITIONS

The phrase "high pressure, free-radical polymerization process," as used herein, refers to a free radical initiated polymerization carried out at an elevated pressure of at least 1000 bar (100 MPa).

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "ethylene-based polymer," as used herein, refers to a polymer that comprises a majority amount of polymerized ethylene monomer (based on weight of the polymer) and, optionally, may contain at least one comonomer.

The term "ethylene/α-olefin interpolymer," as used herein, refers to an interpolymer that comprises a majority amount of polymerized ethylene monomer (based on the weight of the interpolymer) and at least one α-olefin.

The term, "ethylene/α-olefin copolymer," as used herein, refers to a copolymer that comprises a majority amount of polymerized ethylene monomer (based on the weight of the copolymer), and an α-olefin, as the only two monomer types.

The term "propylene-based polymer," as used herein, refers to a polymer that comprises a majority amount of polymerized propylene monomer (based on weight of the polymer) and, optionally, may comprise at least one comonomer.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Samples for density measurements were prepared according to ASTM D 4703-10. Samples were pressed at 374° F. (190° C.), for five minutes, at 10,000 psi (68 MPa). The temperature was maintained at 374° F. (190° C.) for the above five minutes, and then the pressure was increased to 30,000 psi (207 MPa) for three minutes. This was followed by a one minute hold at 70° F. (21° C.) and 30,000 psi (207 MPa). Measurements were made within one hour of sample pressing using ASTM D792-08, Method B.

Melt Index

Melt index, or I2, was measured in accordance with ASTM D 1238-10, Condition 190° C./2.16 kg, Method A, and was reported in grams eluted per 10 minutes.

Nuclear Magnetic Resonance ($^{13}C$ NMR)

Samples were prepared by adding approximately "3 g" of a "50/50 mixture of tetrachloroethane-d2/orthodichlorobenzene, containing 0.025 M Cr(AcAc)$_3$," to a "0.25 to 0.40 g" polymer sample, in a 10 mm NMR tube. Oxygen was removed from the sample by placing the open tubes in a nitrogen environment for at least 45 minutes. The samples were then dissolved, and homogenized, by heating the tube and its contents to 150° C., using a heating block and heat gun. Each dissolved sample was visually inspected to ensure homogeneity. Samples were thoroughly mixed, immediately prior to analysis, and were not allowed to cool before insertion into the heated NMR sample holders.

All data were collected using a Bruker 400 MHz spectrometer. The data was acquired using a six second pulse repetition delay, 90-degree flip angles, and inverse gated decoupling, with a sample temperature of 120° C. All measurements were made on non-spinning samples in locked mode. Samples were allowed to thermally equilibrate for seven minutes prior to data acquisition. The 13C NMR chemical shifts were internally referenced to the EEE triad at 30.0 ppm. The "C6+" value is a direct measure of C6+ branches in LDPE, where the long branches are not distinguished from "chain ends." The "32.2 ppm" peak, representing the third carbon from the end of all chains or branches of six or more carbons, is used to determine the "C6+" value. CO units per 1000 C is determined as the integral of the 43 ppm peak divided by 2. In the ECO, the mol % CO and the wt % CO values are the same.

Mol % CO is calculated from:
CO units/1000 C=moles CO per 1000 total carbons
Mols ethylene=(1000−CO units/1000 C)/2

1H NMR

Sample Preparation

The samples were prepared by adding approximately 130 mg of sample to "3.25 g of 50/50, by weight, tetrachlorethane-d2/perchloroethylene" with 0.001 M Cr(AcAc)$_3$, in a NORELL 1001-7, 10 mm NMR tube. The samples were purged by bubbling N2 through the solvent, via a pipette inserted into the tube, for approximately five minutes, to prevent oxidation. Each tube was capped, sealed with TEFLON tape, and then soaked at room temperature, overnight, to facilitate sample dissolution. The samples were kept in a N2 purge box, during storage, before, and after, preparation, to minimize exposure to 02. The samples were heated and vortexed at 115° C. to ensure homogeneity.

Data Acquisition Parameters

The 1H NMR was performed on a Bruker AVANCE 400 MHz spectrometer, equipped with a Bruker Dual DUL high-temperature CryoProbe, and a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 4 scans, SWH 10,000 Hz, AQ 1.64 s, D1 14 s. The double presaturation experiment was run with a modified pulse sequence, TD 32768, 100 scans, DS 4, SWH 10,000 Hz, AQ 1.64 s, D1 1 s, D13 13 s.

Data Analysis—1H NMR Calculations

The signal from residual 1H in TCE (Tetrachloroethane)-d2 (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

In the presaturation experiment spectrum, the regions for cis- and trans-vinylene, trisubstituted, vinyl, and vinylidene were integrated. The integral of the whole polymer from the control experiment was divided by two, to obtain a value representing X thousands of carbons (i.e., if the polymer integral=28,000, this represents 14,000 carbons, and X=14).

The unsaturated group integrals, divided by the corresponding number of protons contributing to that integral, represent the moles of each type of unsaturation per X thousand carbons. Dividing the moles of each type of unsaturation by X, then gives the moles of unsaturated groups per 1000 moles of carbons.

Melt Strength

Melt strength measurements were conducted on a Gottfert Rheotens 71.97 (Goettfert Inc.; Rock Hill, S.C.), attached to a Gottfert Rheotester 2000 capillary rheometer. The melted sample (about 25 to 30 grams) was fed with a Goettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s². The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s²; capillary diameter=2.0 mm; capillary length=30 mm; and barrel diameter=12 mm.

Dynamic Mechanical Spectroscopy (DMS)

Resins were compression-molded into "3 mm thick×1 inch" circular plaques at 350° F., for five minutes, under 1500 psi pressure, in air. The sample was then taken out of the press, and placed on a counter to cool.

A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of "2 mm," the sample trimmed (extra sample that extends beyond the circumference of the "25 mm diameter" plate was removed), and then the test was started. The method had an additional five minute delay built in, to allow for temperature equilibrium. The experiments were performed at 190° C. over a frequency range of 0.1 to 100 rad/s. The strain amplitude was constant at 10%. The complex viscosity η*, tan (δ) or tan delta, viscosity at 0.1 rad/s (V0.1), the viscosity at 100 rad/s (V100), and the viscosity ratio (V0.1/V100) were calculated from these data.

Triple Detector Gel Permeation Chromatography (TDGPC)—Conventional GPC, Light Scattering GPC, Viscometry GPC and gpcBR For the GPC techniques used herein (Conventional GPC, Light Scattering GPC, and gpcBR), a Triple Detector Gel Permeation Chromatography (3D-GPC or TDGPC) system was used. This system consisted of a Waters (Milford, Mass.) model 150 C High Temperature Chromatograph (other suitable high temperatures GPC instruments include Polymer Laboratories (Shropshire, UK) Model 210 and Model 220), equipped with a Precision Detectors (Amherst, Mass.) 2-angle laser light scattering (LS) detector Model 2040, an IR4 infra-red detector from Polymer ChAR (Valencia, Spain), and a Viscotek (Houston, Tex.) 150R 4-capillary solution viscometer (DP).

A GPC with these latter two independent detectors and at least one of the former detectors is sometimes referred to as "3D-GPC" or "TDGPC," while the term "GPC" alone generally refers to conventional GPC. Data collection was performed using Viscotek TriSEC software, Version 3, and a 4-channel Viscotek Data Manager DM400. The system was also equipped with an on-line solvent degassing device from Polymer Laboratories (Shropshire, United Kingdom).

The eluent from the GPC column set flowed through each detector arranged in series, in the following order: LS detector, IR4 detector, then DP detector. The systematic approach for the determination of multi-detector offsets was performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (MW and intrinsic viscosity) results from using a broad polyethylene standard, as outlined in the section on Light Scattering (LS) GPC below, in the paragraph following Equation (5).

Suitable high temperature GPC columns can be used, such as four 30 cm long Shodex HT803 13 micron columns, four 30 cm Polymer Labs columns of 20-micron mixed-pore-size packing (MixA LS, Polymer Labs), or four 30 cm Olexis-LS columns of 13-micron mixed-pore-size packing (Polymer Labs). Here, the Olexis-LS columns were used. The sample carousel compartment was operated at 140° C., and the column compartment was operated at 150° C. The samples were prepared at a concentration of "0.1 grams of polymer in 50 milliliters of solvent." The chromatographic solvent and the sample preparation solvent was 1,2,4-trichlorobenzene (TCB) containing "200 ppm of 2,6-di-tert-butyl-4methylphenol (BHT)." The solvent was sparged with nitrogen. The polymer samples were gently stirred at 160° C. for four hours. The injection volume was 200 microliters. The flow rate through the GPC was set at 1 ml/minute.

Conventional GPC

For Conventional GPC, the IR4 detector was used, and the GPC column set was calibrated by running 21 narrow molecular weight distribution polystyrene standards. The molecular weight (MW) of the standards ranged from 580 g/mol to 8,400,000 g/mol, and the standards were contained in 6 "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mol, and at "0.05 g in 50 mL of solvent" for molecular weights less than 1,000,000 g/mol. The polystyrene standards were dissolved at 80° C., with gentle agitation, for 30 minutes. The narrow standards mixtures were run first, and in order of decreasing highest molecular weight component, to minimize degradation. The polystyrene standard peak molecular weights were converted to polyethylene molecular weight using Equation (1) (as described in Williams and Ward, J. Polym. Sci., Polym. Letters, 6, 621 (1968)):

$$M\text{polyethylene} = A \times (M\text{polystyrene})^B \quad \text{(Eq. 1)},$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard, as outlined in the section on Light Scattering (LS) GPC below in the paragraph following Equation (5). Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$Mw_{CC} = \sum_i \left( \frac{C_i}{\sum_i C_i} \right) M_i = \sum_i w_i M_{cc,i} \quad \text{(Eq. 2)}$$

$$M_{n,cc} = \sum w_i / \sum (w_i / M_{cc,i}) \quad \text{(Eq. 3)}$$

-continued $$M_{z,cc} = \sum (w_i M_{cc,i}^2) / \sum (w_i M_{cc,i}) \quad \text{(Eq. 4)}$$

Light Scattering (LS) GPC

For the LS GPC, the Precision Detector PDI2040 detector Model 2040 was used. Depending on the sample, either the 15° angle or the 90° angle of the light scattering detector is used for calculation purposes. Here, the 15° angle was used.

The molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration, used in the determination of the molecular weight, was obtained from the mass detector area, and the mass detector constant, derived from a suitable linear polyethylene homopolymer, or one of the polyethylene standards of known weight average molecular weight. The calculated molecular weights were obtained using a light scattering constant, derived from one or more of the polyethylene standards mentioned below, and a refractive index concentration coefficient, do/dc, of 0.104. Generally, the mass detector response and the light scattering constant should be determined from a linear standard with a molecular weight in excess of about 50,000 g/mole. The viscometer calibration can be accomplished using the methods described by the manufacturer, or, alternatively, by using the published values of suitable linear standards, such as Standard Reference Materials (SRM) 1475a (available from National Institute of Standards and Technology (NIST)). The chromatographic concentrations are assumed low enough to eliminate addressing 2nd viral coefficient effects (concentration effects on molecular weight).

With 3D-GPC, absolute weight average molecular weight ("Mw, Abs") is determined using Equation (5) below, using the "peak area" method for higher accuracy and precision. The "LS Area" and the "Conc. Area" are generated by the chromatograph/detectors combination.

$$M_W = \sum_i w_i M_i = \sum_i \left( \frac{C_i}{\sum_i C_i} \right) M_i = \frac{\sum_i C_i M_i}{\sum_i C_i} = \frac{\sum_i LS_i}{\sum_i C_i} = \frac{LS\ \text{Area}}{Conc.\ \text{Area}} \quad \text{(Eq. 5)}$$

For each LS profile, the x-axis (log MWcc-GPC), where cc refers to the conventional calibration curve, is determined as follows. First, the polystyrene standards (see above) are used to calibrate the retention volume into "log $MW_{PS}$." Then, Equation 1 (Mpolyethylene=A×(Mpolystyrene)$^B$) is used to convert "log $MW_{PS}$" to "log $MW_{PE}$." The "log $MW_{PE}$" scale serves as the x-axis for the LS profiles of the experimental section (log $MW_{PE}$ is equated to the log MW (cc-GPC)). The y-axis for each LS profile is the LS detector response normalized by the injected sample mass. Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume.

In the low molecular weight region of the GPC elution curve, the presence of a significant peak that is known to be caused by the presence of anti-oxidant or other additives, will cause an underestimation of the number average molecular weight (Mn) of the polymer sample, to give a overestimation of the sample polydispersity, defined as Mw/Mn, where Mw is the weight average molecular weight. The true polymer sample molecular weight distribution can therefore be calculated from the GPC elution by excluding this extra peak. This process is commonly described as the peak skim feature in data processing procedures in liquid chromatographic analyses. In this process, this additive peak is skimmed off from the GPC elution curve before the sample molecular weight calculation is performed from the GPC elution curve.

Differential Scanning Calorimetry (DSC)

Differential Scanning calorimetry (DSC) was used to measure the melting and crystallization behavior of a polymer over a wide range of temperatures. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at about 175° C.; the melted sample was then air-cooled to room temperature (approx. 25° C.). The film sample was formed by pressing a "0.1 to 0.2 gram" sample at 175° C. at 1,500 psi, and 30 seconds, to form a "0.1 to 0.2 mil thick" film. A 3-10 mg, 6 mm diameter specimen was extracted from the cooled polymer, weighed, placed in a light aluminum pan (ca 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves were recorded. The cool curve was analyzed by setting baseline endpoints from the beginning of crystallization to −20° C. The heat curve was analyzed by setting baseline endpoints from −20° C. to the end of melt. The values determined were peak melting temperature ($T_m$), peak crystallization temperature ($T_c$), heat of fusion ($H_f$) (in Joules per gram), and the calculated % crystallinity for polyethylene samples using: % Crystallinity=(($H_f$)/(292 J/g))×100.

The heat of fusion ($H_f$) and the peak melting temperature were reported from the second heat curve. Peak crystallization temperature is determined from the cooling curve.

EXPERIMENTAL

Preparation of Inventive Ethylene-Based Polymers

Figure 1:
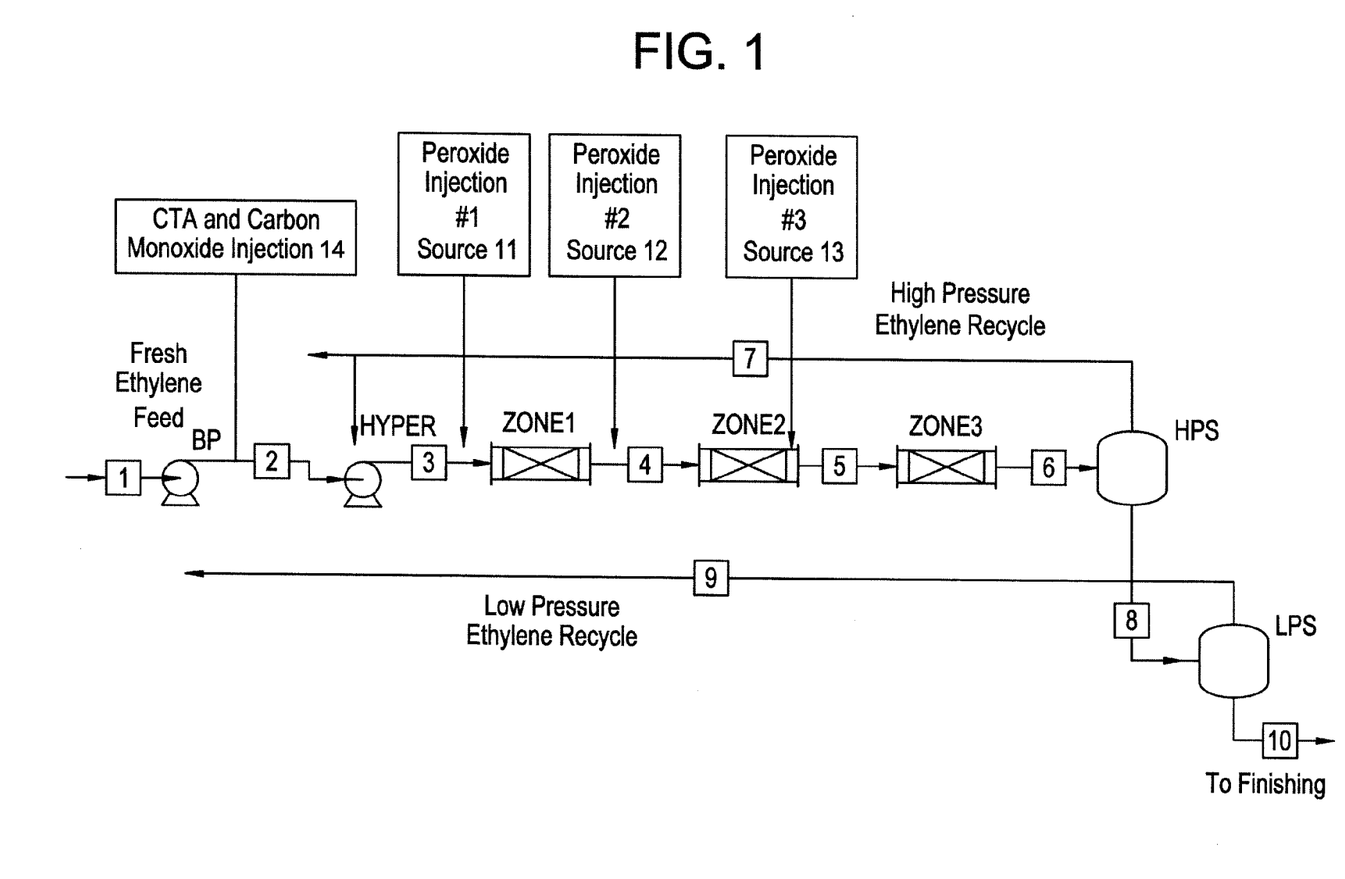
FIG. 1 depicts a process reactor system used in the invention (Examples 1 and 2 and Comparative Example 1)

Examples 1 and 2, as well as Comparative Example 1, were produced on the same process reaction system; therefore, in referring to the same equipment between the runs, the physical process and its units were analogous to one another. FIG. 1 is a block diagram of the process reaction system used to produce the aforementioned Examples 1 and 2 and Comparative Example 1.

The process reaction system in FIG. 1 is a partially closed-loop, dual recycle high-pressure, low density polyethylene production system. The process reaction system is comprised of a fresh ethylene feed line 1; a booster/primary compressor "BP", a hypercompressor "Hyper", and a three zone tube reactor. The tube reactor consists of a first reaction feed zone; a first peroxide initiator line 3 connected to a first peroxide initiator source 11; a second peroxide initiator line 4 connected to the second peroxide initiator source 12; a third peroxide initiator line 5 connected to a third peroxide initiator source 13; cooling jackets (using high pressure water) are mounted around the outer shell of the tube reactor and preheater; a high pressure separator "HPS"; a high pressure recycle line 7; a low pressure separator "LPS"; a low pressure recycle line 9; and a CTA (and carbon monoxide) feed system 14. FIG. 1 also shows a line 2 to the hypercompressor, a line 6 to the high pressure separator, a line 8 to the low pressure separator, and a line 10 to the finishing polymer isolation step(s).

The tube reactor further comprises three reaction zones demarcated by the location of the peroxide injection points. The first reaction zone feed is attached to the front of the tube reactor, and feeds a portion of the process fluid into the first reaction zone. The first reaction zone starts at injection point #1 (3), and ends at injection point #2 (4). The first peroxide initiator is connected to the tube reactor at injection point #1 (3). The second reaction zone starts at injection point #2 (4). The second reaction zone ends at injection point #3 (5). The third reaction zone starts at injection point #3 (5), which is located near the end of the tube reactor. Although the process is capable of running three reaction zones, the second reaction zone was not utilized.

For Examples 1 and 2 and the Comparative Example 1, 100% of the fresh ethylene and ethylene recycle were directed to the first reaction zone, via the first reaction zone feed conduit. This is referred to as an all front gas tubular reactor.

For Examples 1 and 2 and the Comparative Example 1, a mixture, containing t-butyl peroxy-2 ethylhexanoate (TBPO), di-t-butyl peroxide (DTBP), tert-butyl peroxypivalate (PIV) and an iso-paraffinic hydrocarbon solvent (boiling range>179° C.), was used as the initiator mixture for the first injection point. For injection point #3, a mixture, containing DTBP, and TPO and the iso-paraffinic hydrocarbon solvent, was used. Table 1 shows the flows of the peroxide initiator and solvent solution used for each of the trial runs.

TABLE 1

Peroxide Initiator Flows in kg per hour at Each Injection Point for Example 1 and Example 2 and Comparative Example 2.

| Injection Location | Organic peroxide (PO) Material | Example 1 (kg/hr) | Example 2 (kg/hr) | Comparative Example 1 (kg/hr) |
|---|---|---|---|---|
| Injection Point #1 | TBPO | 1.56 | 1.57 | 2.00 |
| | DTBP | 0.78 | 0.79 | 1.00 |
| | PIV | 3.74 | 3.77 | 4.80 |
| | Solvent | 25.12 | 25.28 | 32.20 |
| Injection Point #2 | TBPO | 0.00 | 0.00 | 0.00 |
| | DTBP | 0.00 | 0.00 | 0.00 |
| | Solvent | 0.00 | 0.00 | 0.00 |
| Injection Point #3 | TBPO | 0.65 | 0.66 | 0.84 |
| | DTBP | 1.30 | 1.32 | 1.68 |
| | Solvent | 30.64 | 31.02 | 39.48 |

For Examples 1 and 2 and the Comparative Example 1, isobutane was used as the chain transfer agent (CTA). The isobutane was injected into the ethylene stream at the discharge drum of the first stage booster. The composition of the CTA feed to the process was adjusted between Comparative Example 1 and Examples 1 and 2 for the process runs, to maintain the melt index of the product.

For Examples 1 and 2 and Comparative Example 1, carbon monoxide was used as a comonomer. The carbon monoxide was injected into the ethylene stream at the suction side drum of the first stage booster. The reactor tube process conditions used to manufacture Examples 1 and 2 and Comparative Example 1 are given in Table 2.

TABLE 2

Process Conditions for Example 1 and 2 and Comparative Example 1.

| Process Variables | Example 1 | Example 2 | Comparative Example 1 |
|---|---|---|---|
| Reactor Pressure, psig | 38,300 | 38,300 | 38,335 |
| Zone 1 Initiation Temperature (° C.) | 132 | 132 | 134 |
| Zone 1 Peak Temperature (° C.) | 290 | 290 | 294 |
| Zone 2 Initiation Temperature (° C.) | 235 | 235 | 214 |
| Zone 2 Peak Temperature (° C.) | 284 | 284 | 294 |
| Fresh Ethylene Flow (lb/hr) | 22,171 | 22,200 | 25,068 |
| Ethylene Throughput to Tube Reactor (lb/hr) | 99,900 | 99,900 | 101,000 |
| Ethylene Conversion (%) | 21.3 | 21.8 | 24 |
| Isobutane Flow (lb/hr) | 95 | 120 | 60 |
| Ethylene Purge Flow (lb/hr) | 1,500 | 1,500 | 930 |
| Recycle Isobutane Concentration (wt %) | 2.1 | 2.4 | 1.29 |
| CO Flow (lb/hr) | 430 | 430 | 209 |

Figure 2:
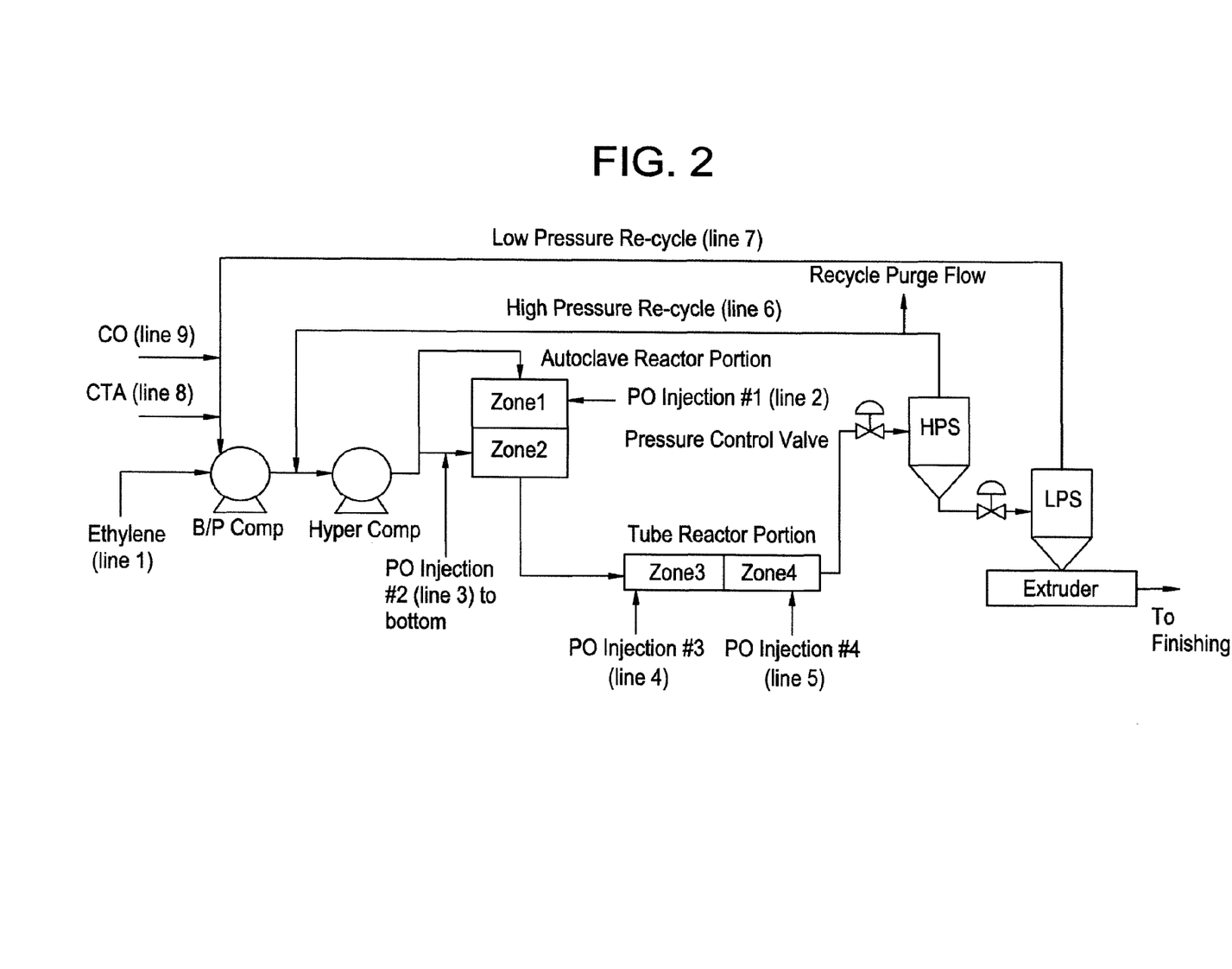
FIG. 2 depicts a process reactor system used in the invention (Examples 3-5 and Comparative Example 2).

Examples 3, 4, and 5 as well as Comparative Example 2, were produced on the same process reaction system; therefore, in referring to the same equipment between the runs, the physical process and its units were analogous to one another. FIG. 2 is a block diagram of the process reaction system used to produce the aforementioned Examples 3, 4, and 5 and Comparative Example 2.

The process reaction system in FIG. 2 is a partially closed-loop, dual recycle high-pressure, low density polyethylene production system. The process reaction system is comprised of a fresh ethylene feed line 1; a booster/primary compressor "BP", a hypercompressor "Hyper", a two zone autoclave followed by a two zone tube reactor. The autoclave/tube reactor consists of a first reaction zone 1; a first peroxide initiator line 2; a second reaction zone 2; a second peroxide initiator line 3; a third tube reaction zone 3; a third peroxide initiator line 4; a forth tube reaction zone 4; a forth peroxide initiator line 5; cooling jackets (using high pressure water) are mounted around the outer shell of the tube reactor portion; a high pressure separator "HPS"; a high pressure recycle line 6; a low pressure separator "LPS"; a low pressure recycle line 7; a CTA feed line 8; and a carbon monoxide feed line 9.

The reactor further comprises 4 reaction zones demarcated by the location of the peroxide injection points. The first reaction zone feed is attached to the autoclave portion where 50% of the total reactor feed is introduced. The first reaction zone starts at injection peroxide injection point #1, and ends at peroxide injection point #2. The second reaction zone starts at peroxide injection point #2 where the other 50% of the total feed is injected. The second reaction zone ends at peroxide injection point #3. The third reaction zone starts at peroxide injection point #3, which is located near the start of the tube reactor, and ends at peroxide injection point #4. The forth reaction zone starts at peroxide injection #4 and ends just before the reactor pressure control valve.

For Examples 3, 4, and 5 and Comparative Example 2, a mixture containing t-butyl peroxy-2 ethylhexanoate (TBPO), tert-butyl peroxypivalate (PIV) and an iso-paraffinic hydrocarbon solvent (boiling range>179° C.), was used as the initiator mixture for the first and second injection points. For injection point #3 and #4, a mixture, containing di-t-butyl peroxide (DTBP), and TPO and the iso-paraffinic hydrocarbon solvent, was used. Table 3 shows the flows of the peroxide initiator and solvent solution used for each of the trial runs.

TABLE 3

Peroxide Initiator Flows in "liters per hour" at Each Injection Point for Examples 3, 4, and 5 and Comparative Example 2.

| | Organic peroxide (PO) | Example 3 | Example 4 | Example 5 | Comparative Example 2 |
|---|---|---|---|---|---|
| | Material | lt/hr | lt/hr | lt/hr | lt/hr |
| Injection Point #1 | PIV | 4.1 | 6.8 | 6.7 | 3.8 |
| | TPO | 1.4 | 2.3 | 2.3 | 1.3 |
| | DTBP | 0.0 | 0.0 | 0.0 | 0.0 |
| | Solvent | 15.5 | 26.0 | 25.5 | 14.4 |
| | Total | 21.0 | 35.2 | 34.5 | 19.5 |
| Injection Point #2 | PIV | 4.9 | 7.2 | 6.8 | 4.9 |
| | TPO | 1.7 | 2.5 | 2.3 | 1.7 |
| | DTBP | 0.0 | 0.0 | 0.0 | 0.0 |
| | Solvent | 18.9 | 27.5 | 25.9 | 18.8 |
| | Total | 25.5 | 37.2 | 35.0 | 25.4 |
| Injection Point #3 | PIV | 0 | 0 | 0 | 0 |
| | TPO | 3.0 | 3.4 | 2.9 | 3.3 |
| | DTBP | 0.6 | 0.7 | 0.6 | 0.7 |
| | Solvent | 17.8 | 20.0 | 17.1 | 19.5 |
| | Total | 21.4 | 24 | 20.5 | 23.4 |
| Injection Point #4 | PIV | 0.00 | 0.00 | 0.00 | 0.00 |
| | TPO | 0.06 | 0.06 | 0.03 | 0.05 |
| | DTBP | 0.01 | 0.01 | 0.01 | 0.01 |
| | Solvent | 0.34 | 0.37 | 0.20 | 0.32 |
| | Total | 0.41 | 0.45 | 0.24 | 0.38 |

For Examples 3, 4, and 5 and the Comparative Example 2, a combination of propylene, and methyl ethyl ketone were used as the chain transfer agent (CTA). The CTA mix was injected into the ethylene stream at the suction side of the booster/primary compressor. The composition of the CTA feed to the process was adjusted between Comparative Example 2 and Examples 3, 4, and 5 for the process runs, to adjust the melt index of the product.

For Examples 3, 4, and 5 and Comparative Example 2, carbon monoxide was used as a comonomer. The carbon monoxide was injected into the ethylene stream at the suction side booster/primary compressor. The reactor process conditions used to manufacture Examples 3, 4, and 5 and Comparative Example 2 are given in Table 4.

TABLE 4

Process Conditions for Examples 3, 4, and 5, and Comparative Example 2.

| Process Variable | Example 3 | Example 4 | Example 5 | Comparative Example 2 |
|---|---|---|---|---|
| Pressure (bar) | 2,423 | 1,990 | 1,990 | 2,428 |
| Ethylene Conversion (%) | 25.7 | 25.7 | 25.7 | 25.7 |
| Ethylene Feed 1 (Mt/hr) | 17.07 | 17.08 | 17.06 | 17.14 |

TABLE 4-continued

Process Conditions for Examples 3, 4, and 5, and Comparative Example 2.

| Process Variable | Example 3 | Example 4 | Example 5 | Comparative Example 2 |
|---|---|---|---|---|
| Ethylene Feed 2 (Mt/hr) | 17.05 | 17.06 | 17.05 | 17.12 |
| Top Feed (° C.) | 47 | 44 | 44 | 46 |
| Bottom Feed (° C.) | 35 | 35 | 35 | 35 |
| Zone 1 Temp (° C.) | 220 | 220 | 221 | 220 |
| Zone 2 Temp (° C.) | 230 | 230 | 230 | 230 |
| Re-intiation temp (° C.) | 229 | 230 | 230 | 230 |
| Tube Peak 1 Temp (° C.) | 282 | 282 | 282 | 282 |
| Re-intiation temp (° C.) | 216 | 215 | 226 | 205 |
| Tube Peak 2 Temp (° C.) | 285 | 285 | 285 | 285 |
| CO Flow (Kg/hr) | 160 | 160 | 160 | 0 |
| Propylene Flow (kg/hr) | 141 | 137 | 116 | 162 |
| MEK Flow (kg/hr) | 0.26 | 0.89 | 0.25 | 0.14 |

Properties of Examples and Comparative Examples are listed in Tables 5-10. Table 5 contains the melt index (I2), density, and the conventional GPC parameters from the TDGPC. The melt index of Examples 1-5 are in a suitable range for their use in extrusion coating. The densities of Examples 1-5 are high, in part, due to the incorporation of carbon monoxide (CO). The inventive examples are useful in applications, such as extrusion coating, especially Example 3-5 with their broader molecular weight distribution (cc-GPC Mw/Mn). Table 6 contains the TDGPC-related properties derived from the LS and viscosity detectors, in conjunction with the concentration detector.

Table 7 contains the DMS viscosity data, as summarized by the following: the viscosities measured at 0.1, 1, 10, and 100 rad/s; the viscosity ratio or the ratio of the viscosity measured at 0.1 rad/s to the viscosity measured at 100 rad/s, each measured at 190° C.; and the tan delta measured at 0.1 rad/s and 190° C.

Table 8 contains the CO (carbon monoxide) content, and the branches per 1000 C as measured by $^{13}C$ NMR. These polymers contain amyl, or C5 branches, which are not contained in substantially linear polyethylenes, such as AFFINITY Polyolefin Plastomers, or LLDPE, such as DOWLEX Polyethylene Resins, both produced by The Dow Chemical Company. Inventive Examples 1-5 and Comparative Example 1-2 contained greater than, or equal to, 0.5 amyl groups (branches) per 1000 carbon atoms (the inventive examples contain greater than 1.0 amyl groups (branches) per 1000 carbon atoms). The inventive examples also contain CO at a level of from 1 to 2 mol % CO, or from 1 to 2 wt % CO.

Figure 3:
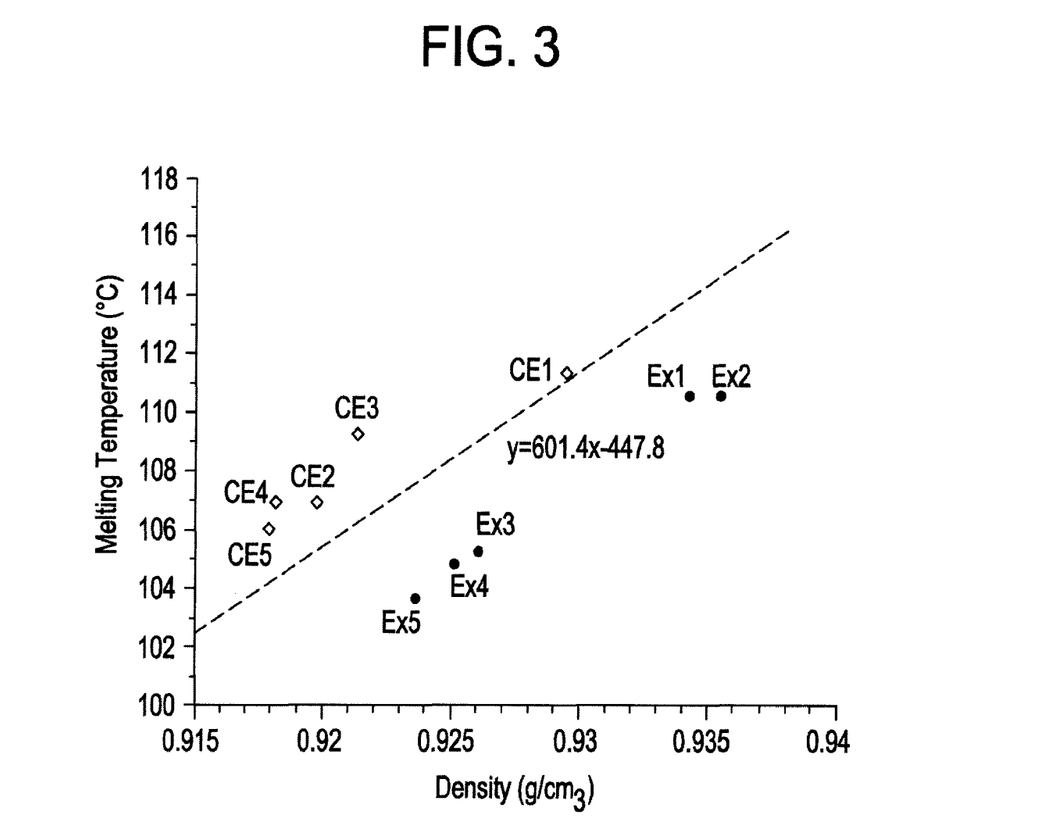
FIG. 3 depicts "melting temperature versus density" for inventive and comparative examples.

Table 9 contains unsaturation results by $^1H$ NMR. Table 10 contains the DSC results, including melting point (Tm), the heat of fusion, the percent crystallinity, and the crystallization point. The melting point for the inventive examples are relatively low for their high densities, as shown in FIG. 3.

TABLE 5

Melt Index (I2), Density, Melt Strength (MS) and Melt Strength Velocity at Break at 190° C. and TDGPC-related properties (conventional calibration).

| Sample | I2 (190° C.) | Density (g/cc) | Melt strength (cN) | Velocity at break (mm/s) | cc-GPC Mn (g/mol) | cc-GPC Mw (g/mol) | cc-GPC Mz (g/mol) | cc-GPC Mw/Mn |
|---|---|---|---|---|---|---|---|---|
| Ex. 1 | 5.4 | 0.9342 | 2.5 | 384 | 15,570 | 79,540 | 238,280 | 5.11 |
| Ex. 2 | 9.7 | 0.9354 | 1.3 | 342 | 14,509 | 72,341 | 221,481 | 4.99 |
| CE 1 | 0.51 | 0.9294 | 16.1 | 129 | 18,656 | 112,287 | 337,486 | 6.02 |
| Ex. 3 | 5.7 | 0.9260 | 8.6 | 363 | 14,468 | 134,234 | 508,683 | 9.28 |
| Ex. 4 | 7.9 | 0.9251 | 7.6 | 394 | 13,091 | 141,568 | 566,131 | 10.81 |
| Ex. 5 | 15.8 | 0.9236 | 3.5 | 346 | 11,599 | 117,814 | 487,064 | 10.16 |
| CE 2 | 5.8 | 0.9198 | 5.7 | 384 | 13,749 | 105,335 | 402,006 | 7.66 |
| CE 3 | 5.5 | 0.9214 | 7.7 | 370 | 14,323 | 135,455 | 544,281 | 9.46 |
| CE 4 | 8.2 | 0.9182 | 5.9 | 332 | 14,603 | 145,124 | 558,810 | 9.94 |
| CE 5 | 16.6 | 0.9179 | 2.2 | 317 | 13,570 | 129,120 | 517,526 | 9.51 |

TABLE 6

TDGPC-related properties (derived from LS and viscosity detectors in conjunction with the concentration detector).

| Sample | Mw-abs (g/mol) | Mz-abs (g/mol) | Mz-abs/Mw-abs | Mw(LS-abs)/Mw(cc-GPC) | IVw (dl/g) | gpcBR | IVcc (dl/g) | IVcc/IVw |
|---|---|---|---|---|---|---|---|---|
| Ex. 1 | 134,950 | 1,364,616 | 10.11 | 1.70 | 1.14 | 1.48 | 1.74 | 1.52 |
| Ex. 2 | 120,248 | 1,057,269 | 8.79 | 1.66 | 0.94 | 1.16 | 1.38 | 1.47 |
| CE 1 | 224,953 | 1,717,255 | 7.63 | 2.00 | 0.88 | 1.15 | 1.29 | 1.46 |
| Ex. 3 | 297,184 | 1,934,313 | 6.51 | 2.21 | 0.99 | 2.43 | 1.91 | 1.27 |
| Ex. 4 | 347,812 | 2,407,766 | 6.92 | 2.46 | 0.97 | 2.86 | 1.96 | 1.46 |
| Ex. 5 | 267,131 | 1,996,863 | 7.48 | 2.27 | 0.88 | 2.54 | 1.72 | 1.48 |
| CE 2 | 212,819 | 1,627,721 | 7.65 | 2.02 | 0.88 | 2.08 | 1.62 | 1.29 |
| CE 3 | 336,852 | 2,450,682 | 7.28 | 2.49 | 0.92 | 2.97 | 1.91 | 1.56 |
| CE 4 | 400,743 | 2,690,670 | 6.71 | 2.76 | 0.91 | 3.61 | 2.01 | 1.80 |
| CE 5 | 357,494 | 2,598,656 | 7.27 | 2.77 | 0.84 | 3.60 | 1.84 | 1.96 |

TABLE 7

Viscosities in Pa · s, Viscosity Ratio, and Tan Delta, all at 190° C.

| Sample | Visc. 0.1 rad/s | Visc. 1 rad/s | Visc. 10 rad/s | Visc. 100 rad/s | Vis. Ratio V0.1/V100 | Tan Delta 0.1 rad/s |
|---|---|---|---|---|---|---|
| Ex. 1 | 3,727 | 2,328 | 1,070 | 367 | 10.2 | 3.6 |
| Ex. 2 | 1,966 | 1,370 | 720 | 275 | 7.1 | 4.8 |
| CE 1 | 23,433 | 9,602 | 2,920 | 716 | 32.7 | 1.9 |
| Ex. 3 | 2,901 | 1,856 | 817 | 278 | 10.4 | 4.5 |
| Ex. 4 | 2,167 | 1,414 | 644 | 229 | 9.5 | 4.8 |
| Ex. 5 | 1,009 | 801 | 427 | 170 | 5.9 | 9.4 |
| CE 2 | 2,676 | 1,833 | 849 | 296 | 9.0 | 6.0 |
| CE 3 | 2,854 | 1,853 | 841 | 295 | 9.7 | 5.0 |
| CE 4 | 1,803 | 1,287 | 634 | 237 | 7.6 | 6.7 |
| CE 5 | 841 | 703 | 406 | 173 | 4.9 | 13.5 |

TABLE 8

Branching Results by $^{13}$C NMR

| Sample | C1 (/1000 C) | 1,3 diethyl branches (/1000 C) | C2 on Quat Carbon (/1000 C) | C4 (/1000 C) | C5 (/1000 C) | C6+ (/1000 C) | Mol % or Wt % CO*** |
|---|---|---|---|---|---|---|---|
| Ex. 1 | ND | 2.66 | 0.92 | 5.19 | 1.65 | 3.30 | 1.57 |
| Ex. 2 | ND | 2.57 | 0.80 | 5.26 | 1.82 | 3.50 | 1.55 |
| CE 1 | ND | 2.88 | 0.97 | 5.63 | 1.88 | 3.10 | 0.75 |
| Ex. 3 | 3.81 | 3.48 | 1.16 | 5.57 | 1.43 | 3.3 | 1.25 |
| Ex. 4 | 2.96 | 4.07 | 1.66 | 6.27 | 1.54 | 3.4 | 1.25 |
| Ex. 5 | 3.83 | 3.96 | 1.51 | 6.17 | 1.4 | 3.4 | 1.19 |
| CE 2 | 4.94 | 3.43 | 1.33 | 5.46 | 1.68 | 3.2 | ND |
| CE 3 | ND | 4.01 | 1.69 | 6.67 | 1.86 | 3 | ND |
| CE 4 | ND | 4.65 | 1.9 | 7.52 | 2.14 | 3.2 | ND |
| CE 5 | ND | 4.95 | 2.04 | 7.43 | 2.2 | 3.4 | ND |

TABLE 8-continued

Branching Results by $^{13}$C NMR

| Sample | C1 (/1000 C) | 1,3 diethyl branches (/1000 C) | C2 on Quat Carbon (/1000 C) | C4 (/1000 C) | C5 (/1000 C) | C6+ (/1000 C) | Mol % or Wt % CO*** |
|---|---|---|---|---|---|---|---|
| CE 6 | ND | ND | ND | ND | ND | 19.5* | ND |
| CE 7 | ND | ND | ND | ND | ND | 11.4* | ND |

*The values in the C6+ column for the DOWLEX and AFFINITY samples represent C6 branches from octene only, and do not include chain ends.
**ND = not detected.
***Based on the weight of the polymer

TABLE 9

Unsaturation Results by $^1$H NMR

| Sample | vinyl/ 1000C | cis and trans/ 1000C | trisub/ 1000C | vinylidene/ 1000C | total unsaturation/ 1000C |
|---|---|---|---|---|---|
| Ex. 1 | 0.036 | 0.023 | 0.035 | 0.091 | 0.19 |
| Ex. 2 | 0.039 | 0.034 | 0.034 | 0.083 | 0.19 |
| CE 1 | 0.052 | 0.045 | 0.051 | 0.130 | 0.28 |
| Ex. 3 | 0.243 | 0.056 | 0.066 | 0.146 | 0.51 |
| Ex. 4 | 0.187 | 0.054 | 0.078 | 0.185 | 0.50 |
| Ex. 5 | 0.238 | 0.058 | 0.079 | 0.185 | 0.56 |
| CE 2 | 0.283 | 0.050 | 0.045 | 0.126 | 0.50 |
| CE 3 | 0.030 | 0.027 | 0.057 | 0.178 | 0.29 |
| CE 4 | 0.039 | 0.035 | 0.083 | 0.217 | 0.37 |
| CE 5 | 0.046 | 0.041 | 0.097 | 0.235 | 0.42 |
| CE 6 | 0.040 | 0.064 | 0.123 | 0.043 | 0.27 |
| CE 7 | 0.283 | 0.049 | 0.042 | 0.055 | 0.43 |

TABLE 10

DSC Results.

| Sample | Tm (° C.) | Heat of Fusion (J/g) | % Crystallinity | Tc (° C.) |
|---|---|---|---|---|
| Ex. 1 | 110.6 | 151.2 | 51.8 | 99.1 |
| Ex. 2 | 110.6 | 150.7 | 51.6 | 98.4 |
| CE 1 | 111.4 | 146.0 | 50.0 | 99.1 |
| Ex. 3 | 105.4 | 136.5 | 46.7 | 93.2 |
| Ex. 4 | 104.9 | 133.6 | 45.8 | 93.2 |
| Ex. 5 | 103.7 | 132.9 | 45.5 | 91.4 |
| CE 2 | 106.9 | 138.6 | 47.5 | 93.6 |
| CE 3 | 109.3 | 142.3 | 48.7 | 98.0 |
| CE 4 | 107.0 | 133.1 | 45.6 | 95.3 |
| CE 5 | 106.0 | 135.7 | 46.5 | 94.0 |

Extrusion Coating—Fiber Tear Adhesion Testing

Examples 1 and 2 and Comparative Example 8 were extrusion coated using a Black-Clawson Extrusion Coating Line. Comparative Example 8 is a LDPE 722 with a "8.0 g/10 min melt index," and a "0.918 g/cc density," and is available from The Dow Chemical Company. The line used was a "3½ inch, 30:1 L/D, 4:1 compression ratio" single flight screw, with one Mattock mixing section. The extrusion coater ran at melt temperatures ranging from 570° F. (299° C.) to 600° F. (316° C.), as shown in Table 11, and an extrusion speed of 90 RPM, resulting in 250 lb/hr output. Line speeds were run at 440 ft/min, resulting in a "1 mil coating" onto a "50 lb/ream Kraft paper."

Test specimens were cut in "24 inch by 36 inch" dimensions. For each test specimen, two "X cuts, approximately 2 inches on each line of the X," were made in the cross direction of the sample. Each "X cut" was made approximately 6 inches from an edge of the polymer coating in each test specimen. The "X cut" penetrated only the polymer coating. The polymer in one portion of the "X cut" was partially separated from the paper using an utility knife. The released polymer was hand grabbed by an operator, and the test specimen was held down with the other hand of the operator. The polymer was slowly pulled from the paper for a distance of approximately 1 to 2 inches. The slow pull takes approximately 5 to 10 seconds. A "Pass" value was recorded when the adhesion between the polymer layer and the paper surface was stronger than the inter-fiber matrix adhesion of the paper itself (or greater than, or equal to, 5% of the paper surface tore off with the polymer). A "Fail" value was recorded when the polymer layer was pulled from the paper surface, with little or no paper fibers (or less than 5% of the paper surface tore off with the polymer). The percentage of the paper surface that tore off with the polymer was determined by visual inspection of the total area of the polymer coating that was removed from the paper substrate. For each polymer, one test specimen was examined, and two "X cuts" were made in each test specimen.

TABLE 11

Fiber Tear Adhesion Results (two "X cuts" per sample)

| Melt Temperature (° F.) | Melt Temperature (° C.) | Ex. 1 | Ex. 2 | CE 6 |
|---|---|---|---|---|
| 570 | 299 | Fail; Fail | Pass; Pass | Fail; Fail |
| 580 | 304 | Pass; Pass | Pass; Pass | Fail; Fail |
| 590 | 310 | Pass; Pass | Pass; Pass | Fail; Fail |
| 600 | 316 | Pass; Pass | Pass; Pass | Fail; Fail |

Table 11 shows the results from the Kraft paper fiber tear adhesion testing. Example 1 was shown to "Pass" at temperatures from 304 to 316° C. Example 2 "passed" at temperatures from 299 to 316° C. Comparative Example 8 was shown to "Fail" at temperatures from 299 to 316° C. Thus, the adhesion of both Examples 1 and 2 are preferred, as compared to that of Comparative Example 8. The inventive examples can also be extrusion coated at high speeds and high temperatures.

For Examples 3-5, the amount of neck-in (the difference in die width setting minus the actual coating width of the molten web) are lower, or more preferred, as compared to Examples 1 and 2. This will yield less waste at the edges of the substrate do to thinner, less wasteful edge trimming.

Extrusion Coating—Adhesion to MYLAR

Example 1 and Comparative Example 8 were extrusion coated using a Black-Clawson Extrusion Coating Line. The extrusion coater ran at melt temperature of 600° F. (316° C.), as shown in Table 12, and an extrusion speed of 90 RPM, resulting in 250 lb/hr output. Line speeds were run at 440 ft/min, resulting in a "1 mil coating" onto a "50 lb/ream Kraft paper." Slip sheets (50 gauge MYLAR polyester film), approximately 2 feet long and 12 inch wide were dropped onto the moving web of the paper. The paper was removed after the coating was applied to the MYLAR film.

Figure 4:
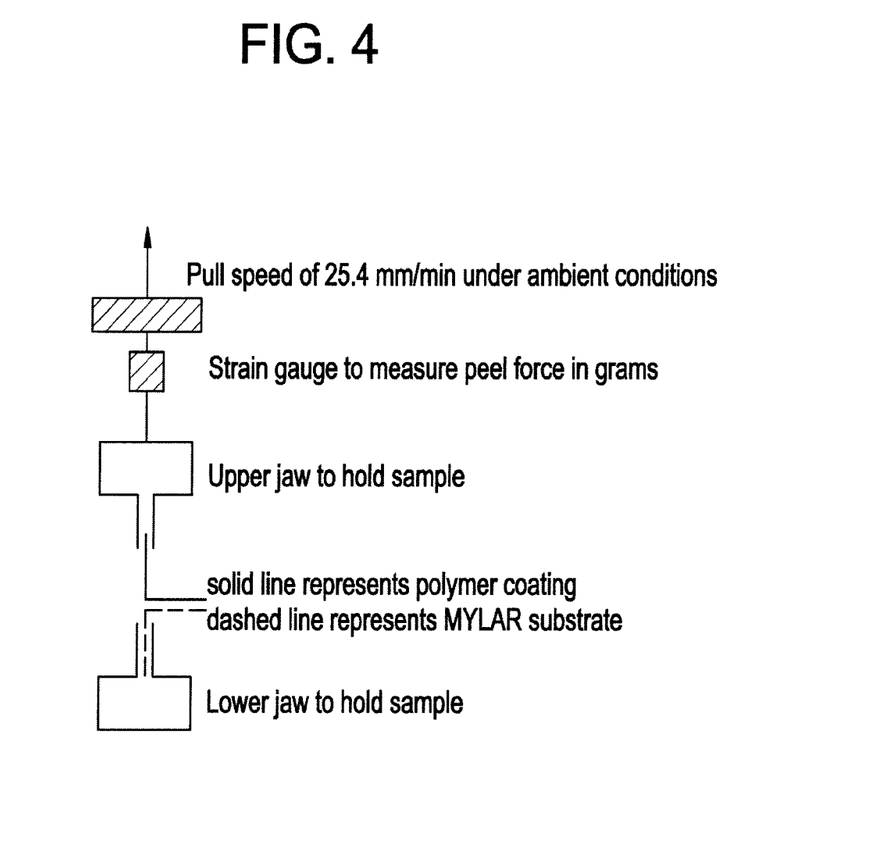
FIG. 4 depicts a schematic of the test jaws (containing test specimen) used in the adhesion to MYLAR test.

Test specimens (1 inch by 6 inch) were cut from the coated MYLAR, and the polymer film was partially separated from the MYLAR using a utility knife, allowing for samples to be clamped in the tensile tester jaws (see FIG. 4). A MTS tensile tester, Model Number Sintech 5/G, was used to test adhesion.

Each test sample was pulled at a pull rate of 25.4 mm/min, and the peak force (peel force), in grams, was measured. Three specimens were pulled for each sample, and the averaged peel force recorded, as shown in Table 12. As seen in Table 12, the inventive example had better adhesion than the comparative example. The inventive example can also be extrusion coated at high speeds and high temperatures.

TABLE 12

Adhesion Results at 600° F. (316° C.)

|  | Average Peel Force (grams) |
|---|---|
| Comparative Example 8 | 22 |
| Inventive Example 1 | 96 |

The invention claimed is:

1. A composition comprising an ethylene-based polymer, formed from a high pressure, free-radical polymerization, and wherein the ethylene-based polymer has the following properties:
   a) a CO content from "greater than 0" to less than 10 weight percent CO (carbon monoxide), based on the weight of the polymer; and
   b) a melt index (I2) from 3 to 30 g/10 min; and
   wherein the ethylene-based polymer has a density from 0.910 to 0.950 g/cc; and
   wherein the ethylene-based polymer has a melting point, $T_m$, in ° C., that meets the following relationship: $T_m$(° C.)<601.4*(Density in g/cc)−447.8(° C.).

2. The composition of claim 1, wherein the ethylene-based polymer has a melting point, $T_m$, in ° C., that meets the following relationship:

$T_m$(° C.)<601.4*(Density in g/cc)−449(° C.).

3. The composition of claim 1, wherein the ethylene-based polymer passes fiber tear adhesion, at a temperature of less than, or equal to, 320° C.

4. The composition of claim 1, wherein the ethylene-based polymer has a melting temperature, $T_m$, from 101° C. to 113° C.

5. The composition of claim 1, wherein the ethylene-based polymer has a melting temperature, $T_m$, from 103° C. to 113° C.

6. The composition of claim 1, wherein the ethylene-based polymer has a melting temperature, $T_m$, greater than 102° C.

7. The composition of claim 1, wherein the ethylene-based polymer has a CO content less than, or equal to, 3 weight percent, based on the weight of the polymer.

8. The composition of claim 1, wherein the ethylene-based polymer has an amyl group level greater than, or equal to, 0.5 amyl group per 1000 carbon atoms, as determined by 13C NMR.

9. The composition of claim 1 wherein the composition further comprises a second ethylene-based polymer.

10. The composition of claim 9, wherein the second ethylene-based polymer is selected from a LDPE, an ethylene/alpha-olefin copolymer, or a combination thereof.

11. An article comprising at least one component formed from the composition of claim 1.

12. The article of claim 11, wherein the article is a coated substrate.

13. The article of claim 11, wherein the article is produced by extrusion coating or extrusion lamination.

* * * * *